ANDREW E. BANKS
CHURN-DASHER
PATENTED
DEC 17 1867
72154
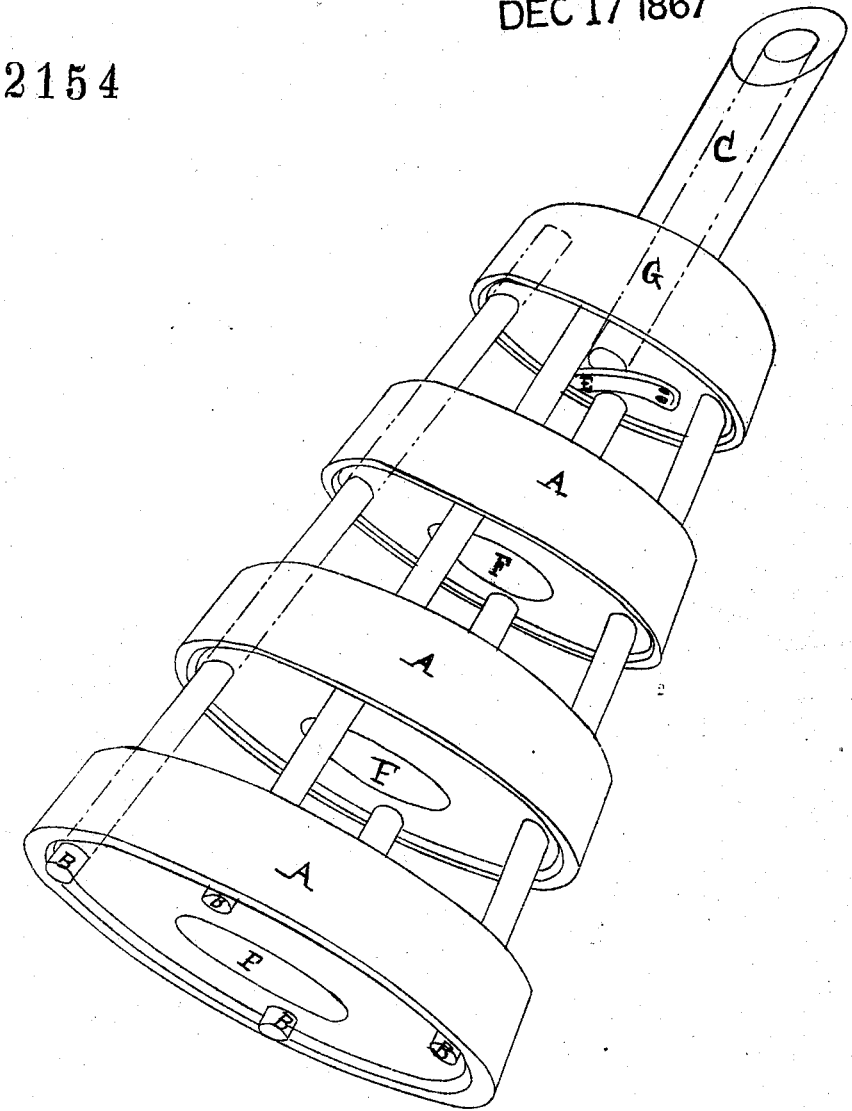
WITNESSES
INVENTOR

United States Patent Office.

ANDREW E. BANKS, OF DETROIT, MICHIGAN.

Letters Patent No. 72,154, dated December 17, 1867.

---

IMPROVEMENT IN CHURN-DASHERS.

---

The Schedule referred to in these Letters Patent and making part of the same.

---

TO WHOM IT MAY CONCERN:

Be it known that I, ANDREW E. BANKS, of Detroit, in the county of Wayne, and State of Michigan, have invented a new and useful Improvement in Churn-Dashers; and I do declare that the following is a true and accurate description thereof, reference being had to the accompanying drawings, and to the letters of reference marked thereon, and making a part of this specification.

The object of my invention is to so construct a churn-dasher as will facilitate butter-making.

The nature of my churn-dasher consists in using three or more disks, the largest one being at the bottom, and each succeeding one above being smaller, made concave or hollow upon the under side, and put together with dowel-pins, which hold the disks in proper position. The handle to the dasher is made hollow, and at the bottom is provided with a proper valve, for the purpose of admitting air into the churn. This air is admitted with the upward movement of the dasher, and the valve closes, retaining the air, in the downward movement. By the motion of the dasher, the air is carried to the bottom of the churn through the holes in the disks, and outwards, against the walls of the churn, by the concavities in the under sides of the disks. By this combination, care being taken to keep the cream at a proper temperature, I have made butter in forty seconds.

I am aware that disks like mine are already in use, but put together in a different manner, by being screwed on to proper standards. I am also aware that a hollow handle, provided with a valve for the induction of air into the churn, is in use; consequently, I make no claim upon either the disks or the hollow handle. My method of putting the disks together by the dowels is much superior to the one in use, where iron screws are used to fasten them to the standards. The only hole through the upper disk or collar is the one through which the hollow handle passes.

Having thus described the construction of my invention, I will now name its various parts. A A A are the disks; B B B B are the dowel-pins; C is the hollow handle; E is the valve; F F F, &c., are the holes through the disks; G is the upper disk or collar. It will be noticed that I allow my dowel-pins to project through the lower disk, and a little below the bottom face of the disk, which prevents all danger of breaking the dasher in striking the bottom of the churn.

What I claim as my invention, and desire to secure by Letters Patent, is—

1. The use of the dowel-pins B B B B, for the purpose described, when arranged substantially as set forth.

2. The combination of the disks A A, &c., with holes through them, F F, &c., the upper disk or collar G, with the hollow handle C, provided with the valve E, and the dowel-pins B B, &c., when arranged substantially as described, and for the purpose designed.

ANDREW E. BANKS.

Witnesses:
    H. G. HANNAMAN,
    JAS. LAIDLAW.